May 4, 1937.   G. J. LIPSCOMB   2,078,955
APPARATUS FOR DRYING VEGETABLE FIBER
Filed Aug. 2, 1934   3 Sheets-Sheet 1
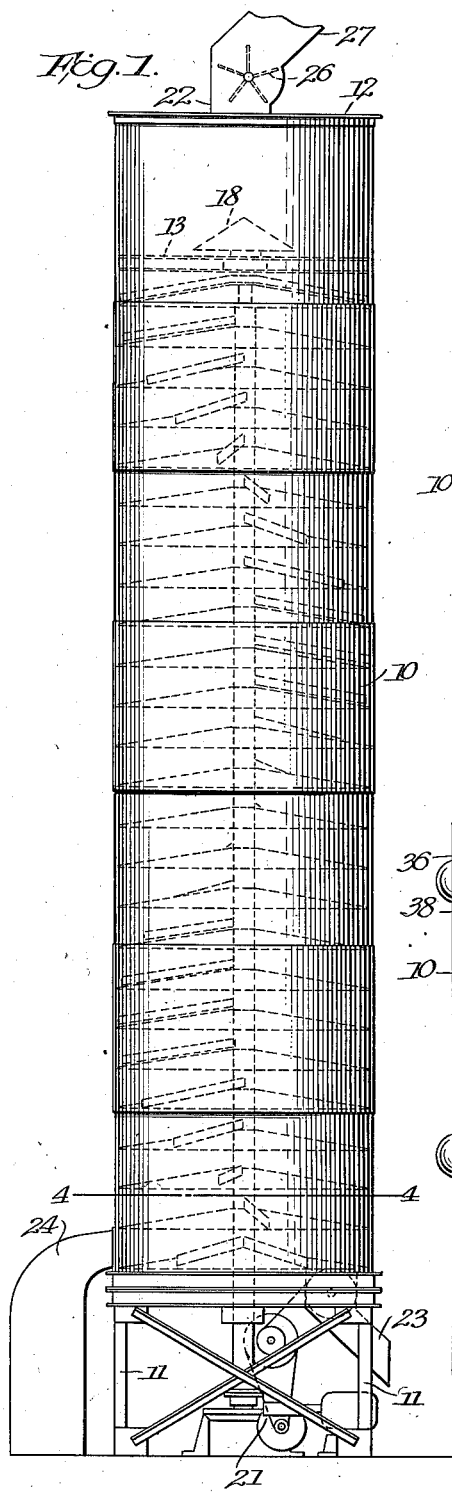
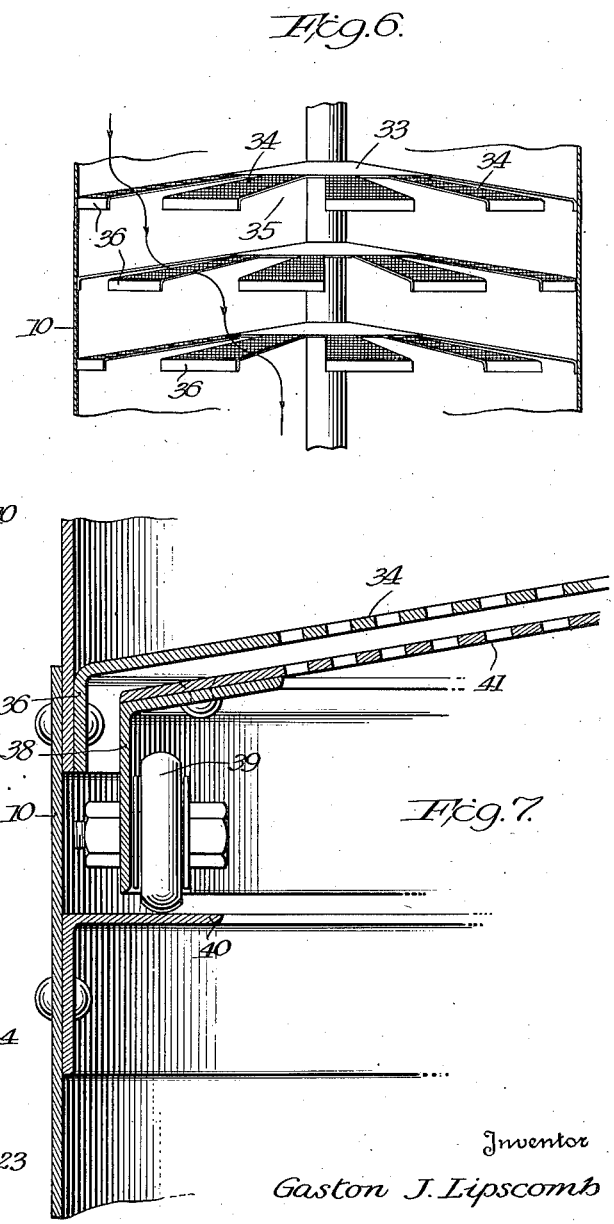
Inventor
Gaston J. Lipscomb
his Attorneys

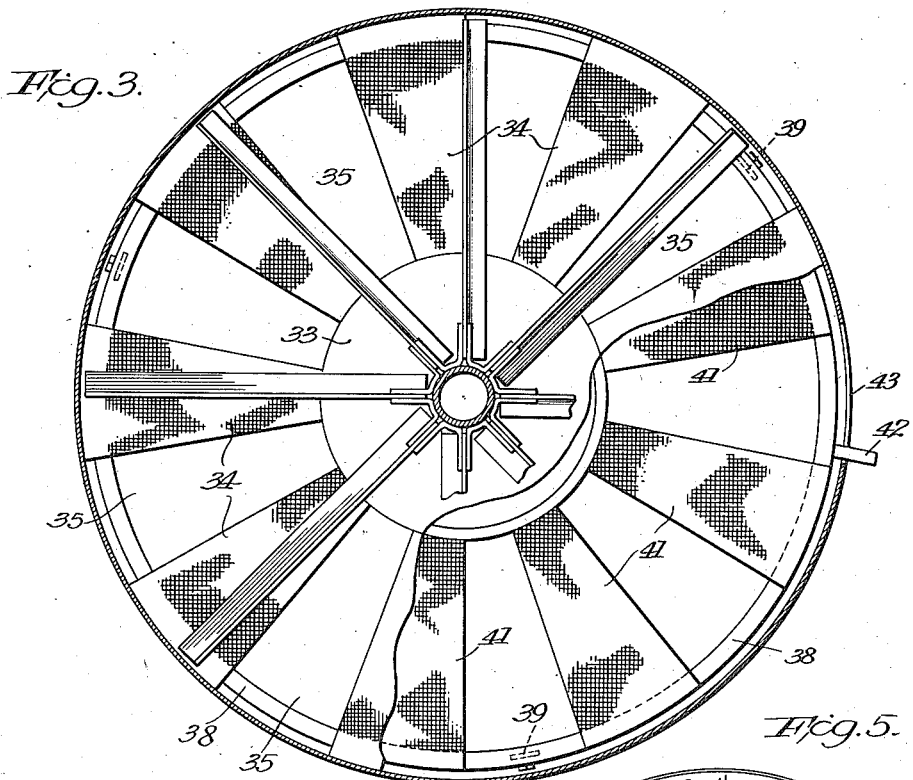
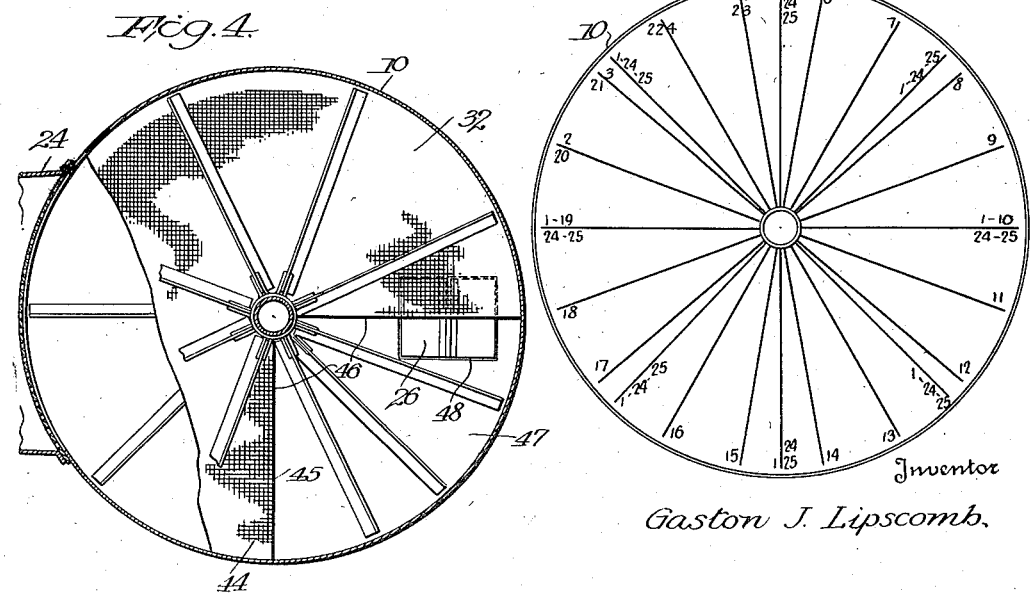

Patented May 4, 1937

2,078,955

UNITED STATES PATENT OFFICE 2,078,955

APPARATUS FOR DRYING VEGETABLE FIBER

Gaston J. Lipscomb, Montclair, N. J.

Application August 2, 1934, Serial No. 738,112

4 Claims. (Cl. 34—23)

The present invention relates to the method and apparatus for drying vegetable fibers, particularly bagasse and the like.

Many vegetable fibrous stocks, such as bagasse, as it comes from the mill, contain a high degree of moisture, usually as high as 40% and 50% of moisture. In the preparation of the fibers for commercial use, either in the manufacture of articles or products or in preparing them for shipment, it is necessary and highly advantageous to extract most of the moisture content. The present invention aims to improve the methods and apparatus for this purpose.

In the preparation of vegetable fiber for commercial use, the bagasse or other vegetable stocks or cane are first broken down or shredded, as for example, by running them through a suitable mill to reduce the stock to fibers and partially remove some of the pith. Advantageously some of the pith is left remaining with the fibers and in this condition the bagasse is a mass of relatively fluffy fibers.

After the stock has been suitably disintegrated or shredded, or otherwise reduced to a fluffy fibrous mass, it is conveyed to a drier where substantially all or a large percentage of the moisture is removed and the fibers are rendered practically dust-free. One form of drier suitable for this purpose is illustrated in the accompanying drawings in which Fig. 1 is a side elevation of a drying apparatus constructed in accordance with the invention;

Fig. 3 is a plan view of the first or No. 1 tier and is taken on the line 3—3 of Fig. 2;

Fig. 4 is a plan view of the next to the last tier as taken on the line 4—4 of Fig. 2;

Fig. 5 is a diagrammatic view illustrating the positioning of the rabble arms;

Fig. 6 is an enlarged sectional elevation illustrating the construction and arrangement of a plurality of central tiers; and Fig. 7 is an enlarged detail sectional view of the adjustable regulator for the material.

Figure 2:
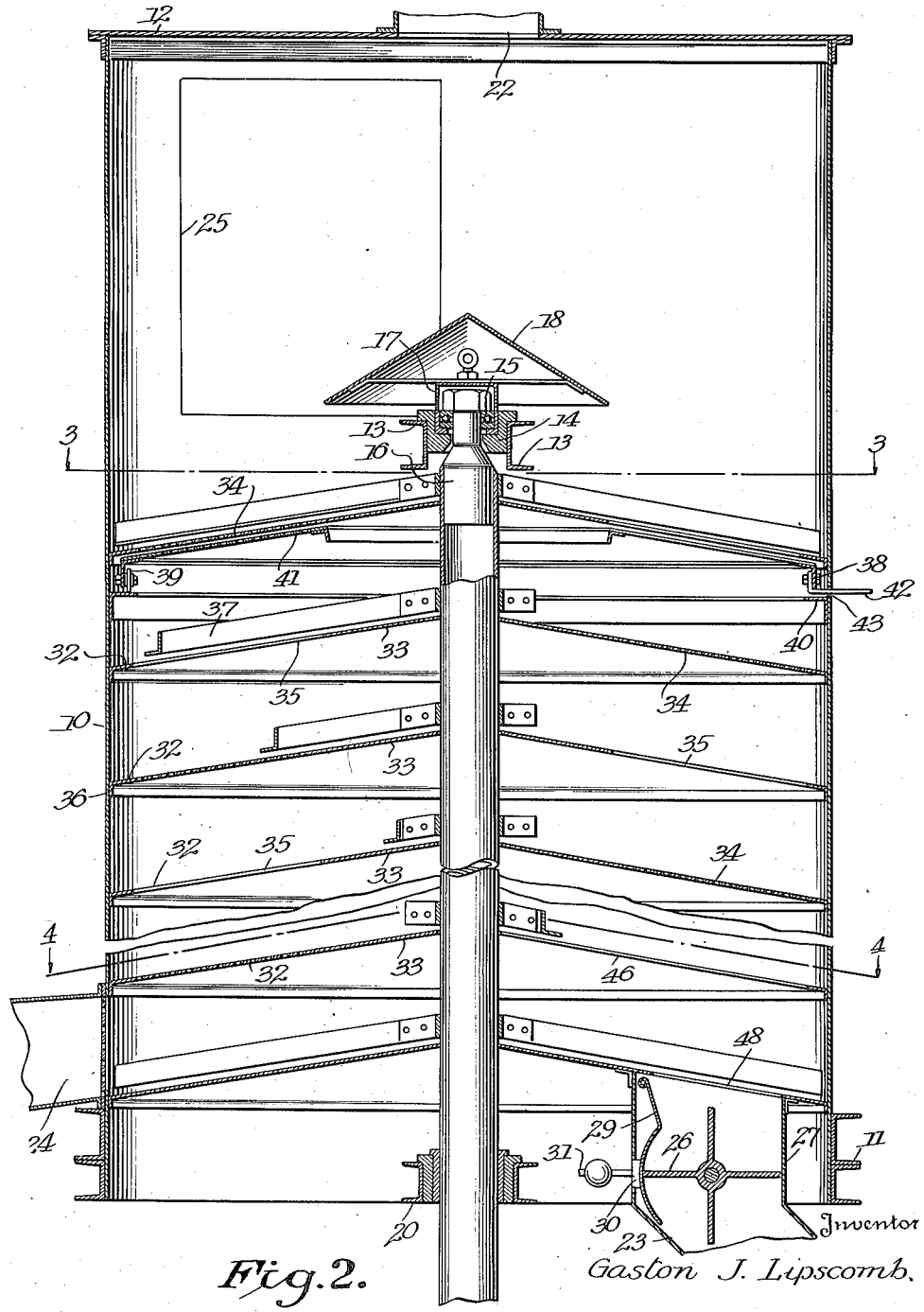
Fig. 2 is an enlarged vertical sectional view thereof illustrating the construction of the upper and lower parts, the central portion of the drier being broken away for purposes of better illustration.

The illustrated form of drier may advantageously comprise an upright cylindrical shell 10 mounted upon a suitable supporting structure 11, and may be closed at its upper end by a cover 12.

Near the upper end of the casing or shell 10 there is provided a pair of suitable supports, as for example, channel bars 13 (see Fig. 2) extending diametrically of the shell, these bars 13 providing a support for a bearing block 14, providing a race for an anti-friction bearing 15 supporting a shaft 16 extending vertically through the casing. Desirably the upper end of the shaft and bearing is enclosed by a dust cap 17 to prevent fines and dust from entering the bearing, and the entire assembly surmounted by a distributing cone or hood 18.

The shaft 16 is preferably disposed axially of the shell or casing 10 and near its lower end is steadied in a steady bearing 19 supported on supports 20 which advantageously may be of a construction similar to the bars 13. Preferably the shaft 16 extends below the bottom of the chamber and is geared to a suitable driving mechanism 21 preferably including a speed reducing mechanism.

According to my invention I introduce a quantity of bagasse fibers into the casing 10 at the inlet 22 near the top thereof and permit it to gradually and slowly descend through the casing 10 and discharge it from the casing at a discharge outlet 23 near the bottom, during which time a relatively strong current of hot air is introduced into the casing at 24 near the bottom and circulated upwardly through the casing to an outlet 25 near the top. The temperature of the air circulated through the casing is 250° F. to 400° F., preferably in excess of 300° F. and is of sufficient velocity (preferably not exceeding 1000 feet per minute) to carry off any dust or fines that may be mixed with or adhered to the fibers.

The feeding and discharge mechanism at the inlet 22 and discharge outlet 23, respectively, are preferably of a construction to permit the periodic feeding and discharge of regulated and predetermined amounts of fibers to and from the casing without permitting substantial air leakage at the feeding and discharge points. One suitable construction for this purpose is a star wheel feeder or discharge 26 mounted within a chute 27 and arranged to closely fit the walls of said chute so as to cut down air leakage at that point. The star wheels of the feeding and discharging mechanism are advantageously positively driven by any suitable mechanism (not shown). The discharge mechanism (see Fig. 2) may also include a pivoted wall 29, adapted to be held continuously in tight frictional engagement with the star wheel 26 by means of a shoe 30 on a pivoted weighted leverance 31 so as to prevent substantial air leakage at this point.

The interior of the casing 10 is provided with a large numers of tiers 32 spaced apart a short distance and on which the fibers are permitted to fall successively. The successive dropping of these fibers in the presence of the drying air current, insures that the fibers are completely and uniformly dried and the maximum amount of the moisture content is removed.

The tiers or shelves 32 are preferably of the umbrella type, presenting downwardly sloping surfaces and are preferably of like construction comprising (see Figs. 2, 3, 4 and 6) a solid hub portion 33 loosely surrounding the shaft 16 and annular spaced perforated segments 34. That is, the annular portion of the tier 32 preferably comprises a plurality of perforated segments 34 (in the illustrated form 9 in number) which are spaced apart, the intervening spaces 35 being of substantially the same area as the perforated portions 34. The outer rim of the tier 32 may be flanged as at 36 and suitably secured to the casing 10.

The perforated portions 34 of the successive tiers are preferably arranged in staggered relation (see Fig. 6), that is, the perforated portion 34 of each tier is arranged immediately below the open space 35 of the tier next above, so that any fibers falling through an opening 35 of any one tier will fall directly upon the perforated portion 34 to the next lower tier. The fibers are brushed or swept off of the tiers by rabble arms 37 secured upon the shaft 16 and as the shaft rotates in a single direction, it will be apparent that the fibers will progress circumferentially around the casing 10 and thus travel through the casing will be in a spiral or helical path, insuring the longest possible treatment. For this purpose the rabble arms are preferably spirally disposed as illustrated diagrammatically by the numerals in Fig. 6.

The amount of fibers passing through the casing may be variably controlled by adjusting the size of the open spaces 34 in the uppermost or first tier 32 so as to regulate the amount or rate of treatment of the fibers independently of the feeding mechanism. To this end an annular frame 38 (see Figs. 2 and 7) may be mounted immediately below the first tier, and supported by means of rollers 39 on a track or support 40 carried by the casing 10. The frame 38 may be provided with a plurality of slides 41, one for each of the openings 30, said slide being preferably perforated and of the same size as said open spaces 34 of the first tier 32 and be advantageously of the same construction as the first tier. Suitable means may be provided, as for example an operating handle 42 (see Fig. 2) for moving the frame and thereby adjusting the position of the slides 41 with reference to the open spaces 34 of the first tier, so as to effectively vary the size of the openings and regulate the amount of fibers delivered to the second and subsequent tiers. If desired, the handle 42 may be made sectional and arranged to project beyond the casing 10 through opening 43, which may, if desired, be closed by a door to prevent leakage of air at this point.

All of the tiers, except the penultimate tier (see Fig. 4) and the lower tier may be of like construction, such for example, as shown in Fig. 3, except that I find sufficient and adequate regulation of the material being treated is effected if the adjustable slide mechanism, shown in Fig. 7, is embodied only in the first or uppermost tier.

The penultimate tier 44, however, (see Fig. 4) is of different construction and comprises a screen or perforated plate 45 covering the major portion of the shell area and providing an open space 46 of substantial size through which the dried fibers may be discharged to the shell bottom. This tier 44 is advantageously positioned within the shell 10, with the discharge opening 46 diametrically opposite the hot air inlet 24 to prevent the dried fibers from being discharged into the inlet 24. Otherwise the fibers would tend to clog the hot air inlet and reduce the volume of air circulated through the drier.

The last or lowermost tier 47 (Figs. 2 and 4) is preferably imperforate except for the provision of a discharge opening 48 communicating with the discharge mechanism 23, which is so positioned that, a substantial portion at least, underlies the opening 46 of the penultimate tier 44, and is therefore diametrically opposite the discharge inlet.

In practicing the invention, fibrous stock, such as bagasse fibers, is delivered to the shell through the inlet supply 27 and is periodically or continuously fed into the casing 10 in uniform predetermined amounts by means of the star wheel feeding mechanism. The fibers entering the casing fall upon the distributing cone 18 and are uniformly distributed on the first tier. In passing through the top end of the casing, the fibers are subjected to the current of hot air which is at a sufficiently high velocity to carry off the dust and fines but permits the larger fibers to pass downwardly through the drier.

Rotation of rabble arms 37 progressively sweeps the fibers from successive tiers 32 causing them to pass through the drier in a helical or spiral path so as to increase as much as possible the length of time of drying. As will be apparent, the number of tiers together with the speed and number of rabble arms controls largely the duration of drying, which for practical purposes should be from 15 to 25 minutes to reduce the moisture contant of the fibers to substantially ten percent or less.

In the illustrated type of apparatus, I find that highly satisfactory operation can be obtained by providing one rabble arm for each of the tiers, except the first tier, the penultimate tier and the last tier, for which there may be eight rabble arms. These act quickly to initially spread the fibers and immediately start their progressive way through the drier. The penultimate tier also may have eight rabble arms so as to quickly and continuously discharge the bagasse from that tier, and thus permit the maximum amount of hot air to be circulated upwardly through the drier. Also the last tier preferably has an equal number of rabble arms so as to continuously feed the dried bagasse to the discharge mechanism as it is continuously deposited on the relatively small surface immediately under the opening 46.

After the fibers are sufficiently dried and reach the bottom of the drier, they fall into the discharge outlet 23 and are periodically discharged from the drier by means of the star wheel discharge mechanism 26.

Obviously the method may be suitably carried out by other apparatus than that shown, the illustrated apparatus being intended to illustrate only one preferred embodiment of the invention.

I claim:

1. Apparatus for drying loose shredded bagasse, comprising a closed vertical casing, means for circulating hot air upwardly through said casing from a point adjacent the bottom to a point near the top thereof, a support within the casing near the upper end thereof, a vertical shaft rotatably mounted in said casing and having its upper end journalled in said support, a conical distributor connected to the upper end of said shaft and rotatable therewith, a plurality of conical tiers each having the solid hub portion and alternate segmental reticulated downwardly sloping supporting surfaces and discharge openings spaced throughout the length of the casing, rabble arms on said shaft overlying each of said tiers for pushing the material outwardly toward the wall of said casing and from a reticulated supporting surface to permit it to fall through an adjacent discharge opening, means for uniformly feeding quantities of loose fibers into the casing at the top thereof and upon the conical distributor to uniformly spread the material upon the uppermost tier, and means operating in synchronism with the feeding of material through the casing, for discharging dried material from the casing.

2. Apparatus for drying loose vegetable fiber such as bagasse, comprising a closed vertical casing, means for circulating hot air upwardly through said casing from a point adjacent the bottom to a point near the top thereof, a vertical shaft rotatably mounted in said casing, a conical distributor connected to the upper end of said shaft and rotatable therewith, a plurality of reticulated tiers having alternate reticulated supporting surfaces and discharge openings spaced throughout the length of the casing, rabble arms on said shaft overlying each of said tiers for pushing the material from a reticulated supporting surface to permit it to fall through an adjacent discharge opening, means for uniformly feeding quantities of loose fibers into the casing at the top thereof and upon the conical distributor to uniformly spread the material upon the uppermost tier, means operating in synchronism with the feeding of material through the casing for discharging dried material from the casing, and means for variably adjusting the effective size of the discharge openings of the first tier to variably control the rate of feeding of the material through the casing.

3. Apparatus for drying loose vegetable fiber such as bagasse, comprising a closed vertical casing, means for circulating hot air upwardly through said casing from a point adjacent the bottom to a point near the top thereof, a vertical shaft rotatably mounted in said casing, a conical distributor connected to the upper end of said shaft and rotatable therewith, a plurality of reticulated tiers having alternate reticulated supporting surfaces and discharge openings spaced throughout the length of the casing, rabble arms on said shaft overlying each of said tiers for pushing the material from a reticulated supporting surface to permit it to fall through an adjacent discharge opening, means for uniformly feeding quantities of loose fibers into the casing at the top thereof and upon the conical distributor to uniformly spread the material upon the uppermost tier, means operating in synchronism with the feeding of material through the casing for discharging dried material from the casing, and means for variably adjusting the effective size of the discharge openings of the first tier to variably control the rate of feeding of the material through the casing, said last named means comprising a frame below and in close proximity to the first tier, a plurality of spaced plates carried by the frame, and means for rotatably mounting the frame to permit the adjustment of the plates carried thereby relative to the supporting surfaces of the first tier.

4. Apparatus for drying loose shredded bagasse, comprising a closed vertical casing, means for circulating hot air upwardly through said casing from a point adjacent the bottom to a point near the top thereof, a vertical shaft rotatably mounted in said casing, a conical distributor connected to the upper end of said shaft and rotatable therewith, a plurality of conical tiers each having an imperforate hub portion and alternate reticulated downwardly sloping supporting surfaces and discharge openings spaced throughout the length of the casing, downwardly inclined rabble arms on said shaft overlying each of said tiers for pushing the material from a reticulated supporting surface to permit it to fall through an adjacent discharge opening, means for uniformly feeding quantities of loose fibers into the casing at the top thereof and upon the conical distributor to uniformly spread the material upon the uppermost tier, rotary means operating in synchronism with the feeding of material through the casing for discharging dried material from the casing, and means including a wall yieldably pressed against said rotary means for preventing the entrance of cold air into the casing as material is discharged therefrom.

GASTON J. LIPSCOMB.